United States Patent [19]

Martin

[11] Patent Number: 5,821,274
[45] Date of Patent: Oct. 13, 1998

[54] STABILIZER AND BLOWING AGENT USEFUL FOR RIGID FOAMED PVC

[75] Inventor: Curtis R. Martin, Morristown, N.J.

[73] Assignee: Witco Corporation, Greenwich, Conn.

[21] Appl. No.: 897,272

[22] Filed: Jul. 21, 1997

Related U.S. Application Data

[62] Division of Ser. No. 583,458, Jan. 5, 1996, Pat. No. 5,686,025.

[51] Int. Cl.$^6$ .......................................................... C08J 9/00
[52] U.S. Cl. .............................. 521/89; 521/93; 521/145; 524/567
[58] Field of Search ................................ 521/89, 93, 145; 524/567

[56] References Cited

U.S. PATENT DOCUMENTS

| | | |
|---|---|---|
| 2,597,920 | 5/1952 | Carroll . |
| 2,641,588 | 6/1953 | Leistner et al. . |
| 2,641,596 | 6/1953 | Leistner et al. . |
| 2,648,650 | 8/1953 | Weinberg et al. . |
| 2,763,632 | 9/1956 | Johnson . |
| 2,809,956 | 10/1957 | Mack et al. . |
| 2,914,506 | 11/1959 | Mack et al. . |
| 3,640,953 | 2/1972 | Brecker et al. . |
| 3,706,679 | 12/1972 | Hopton et al. . |
| 4,255,320 | 3/1981 | Brecker et al. . |
| 4,698,368 | 10/1987 | Müller . |
| 4,977,193 | 12/1990 | Croce et al. . |

*Primary Examiner*—Morton Foelak
*Attorney, Agent, or Firm*—Scully, Scott, Murphy & Presser

[57] ABSTRACT

Improved activation of the blowing agent used to form blown PVC products, as well as thermal stabilization, are provided by a combination of an ester of the formula

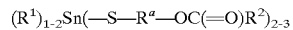

wherein $R^1$ is $C_{1-4}$ alkyl, $R^a$ is alkyl, and $R^2$ is $C_{6-24}$ alkyl or alkenyl; one or both of mono ($C_{1-4}$ alkyl) and di($C_{1-4}$ alkyl) tin sulfides; a complex of diorganotin oxide with an oxygen-containing acid; and optionally an ester HS—$R^c$—OC(=O)$R^3$ wherein $R^c$ is alkyl and $R^3$ is $C_{6-24}$ alkyl or alkenyl.

20 Claims, No Drawings

STABILIZER AND BLOWING AGENT USEFUL FOR RIGID FOAMED PVC

This application is a division of application Ser. No. 08/583,458 filed Jan. 5, 1996 which application, now: U.S. Pat. No. 5,686,025.

FIELD OF THE INVENTION

This invention relates to the stabilization and preparation of foamed polyvinylchloride resins. In particular this invention relates to the use of stabilizers for foamed polyvinylchloride resins as activators for the blowing agents used in the preparation of foamed polyvinylchloride resin. An important aspect of this invention is the use of organotin compounds as the thermal stabilizer and activator for the blowing agent in the preparation of rigid foamed polyvinylchloride products.

BACKGROUND OF THE INVENTION

It is well established that organotin stabilizers are effective for the thermal stabilization of polyvinylchloride resins. U.S. Pat. No. 2,597,920 to Carroll and No. 2,763,632 to Johnson disclosure reaction products of diorganotin oxides and esters of diorganotin oxides as heat and light stabilizers for vinylchloride resins. Despite their high tin content, these reaction products are rather poor in stabilizing effectiveness.

Among the effective organotin stabilizers for inhibiting the polyvinylchloride resins at high temperatures are the organotin mercapto acid esters. Patents disclosing the use of these compounds include U.S. Pat. No. 2,641,588 and No. 2,641,596 to Leistner et al., U.S. Pat. No. 2,648,650 to Weinberg and U.S. Pat. No. 2,809,956 to Mack et al.

The dialkyltin bis-alkylthioglycolates, alone and in combination with other components, have been widely accepted for various commercial applications. Among the combinations reported including the dialkyltin bisalkyl thioglycolates as a component are U.S. Pat. No. 2,914,506 to Mack et al disclosing combinations of organotin thioglycolates with compounds such as metal salts, epoxy compounds, phosphates and phenols and U.S. Pat. No. 3,640,953 to Brecker et al. disclosing combinations of diorganotin mercaptocarboxylic acid esters and a diorganotin-ester complex which is a reaction product of a diorganotin oxide and an ester of an oxygen-containing acid. The combinations of Brecker et al. have particularly been found to be highly efficient in the heat stabilization of polyvinylchloride.

One important utility for polyvinylchloride resins is in the preparation of rigid foamed-articles. The articles are ordinarily manufactured by known methods, for example by extrusion, by blending the plastics material with a suitable blowing agent and choosing the processing temperature such that it is above the decomposition temperatures of the blowing agent. Often, however, the decomposition temperature is too high above the processing temperature, so that the blowing agent cannot be used alone. For this reason, activators are often employed which hasten the decomposition of the blowing agent and/or lower the decomposition temperature.

In the search for effective activators, the use of compounds that are also effective thermal stabilizers has become a highly desirable possibility in order to reduce the number of components of the resin blend. Organotin oxides, organotin alcoholates and mixtures thereof have been described in the literature as being useful as activators. U.S. Pat. No. 4,698,368 to Muller discloses mixtures of organotin mercaptides as imparting good light and heat stability and as being effective activators for the manufacture of foamed plastics. These mixtures can optionally contain an organotin carboxylate. Also disclosed in this patent as being useful as light and heat stabilizers and as activators are mixtures of organotin mercaptides and organotin carboxylates.

U.S. Pat. No. 4,255,320 to Brecker et al. discloses that certain admixtures of compounds of the formula $(R^1)_{1-2}Sn(—S—R—OC(=O)R^2)_{2-3}$ with monoalkyl tin and/or dialkyl tin sulfides are useful as PVC stabilizers, but there is no disclosure as to usefulness as foam activators.

U.S. Pat. No. 3,706,679 to Hopton et al. discloses a mixture of organotin thioglycolate, particularly di-n-butyltin bis(isooctylmercaptoacetate) and barium salts of saturated fatty acids having from 14 to 18 carbon atoms, such as barium stearate or palmitate.

U.S. Pat. No. 4,977,193 to Croce et al. discloses a mixture of at least one organotin mercapto acid ester of the formula $(CH_3)_2Sn(S-Z-(COOR)_m)_2$ wherein Z is an organic radical, R is an organic radical derived from an alcohol having one to about four hydroxyl group and one to thirty carbon atoms, and m is 1–4; and a diorganotin oxide complex with an ester of any of certain oxygen-containing acids.

There remains a need for products which exhibit improved performance as activators in the production of foamed PVC resin, especially rigid foamed PVC resin, while also contributing effectiveness as thermal stabilizers.

BRIEF SUMMARY OF THE INVENTION

One aspect of the present invention is an activator system comprising
(a) one or more compounds of formula (A)

$$(R^1)_a Sn(—S—R^3—OC(=O)R^2)_{4-a} \qquad (A)$$

wherein $R^1$ independently at each occurrence is straight or branched alkyl containing 1 to 12 carbon atoms;

$R^a$ is a divalent alkyl radical containing 2 to 20 carbon atoms;

a is 1 to 2;

$R^2$ independently at each occurrence is straight or branched alkyl or alkenyl containing 6 to 24 carbon atoms and 0 to 4 carbon—carbon double bonds;

admixed with one or more compounds selected from the group consisting of monoalkyl tin sulfides and dialkyltin sulfides, in which group each alkyl substituent is independently straight or branched alkyl containing 1 to 12 carbon atoms; and (b) a diorganotin complex with an ester of an oxygen-containing acid, wherein the two organo groups are each attached to tin through carbon atoms and are hydrocarbon radicals having from one to about thirty carbon atoms, and said complex is derived from the reaction of the corresponding-diorganotin oxide with an ester derived from an aliphatic or aromatic alcohol or phenol and an acid selected from the group consisting of hydrocarbyl carboxylic acids, sulfur-containing hydrocarbyl carboxylic acids, hydroxy-containing hydrocarbyl carboxylic acids, phosphoric acid, sulfuric acid, sulphurous acid, nitric acid, nitrous acid, boric acid, arsenic acid and silicic acid.

Another aspect of the present invention is an activator system comprising the aforementioned components (a) and (b) and a component (c) which is one or more esters of the formula $HS—R^c—OC(=O)R^3$, wherein $R^3$ is a divalent alkyl radical containing 2 to 20 carbon atoms, and $R^3$ is straight or branched alkyl or alkenyl containing 6 to 24 carbon atoms and 0 to 4 carbon—carbon double bonds.

An additional aspect of the present invention is an activator system comprising
(a') one or more compounds of formula (A*)

$$(R^1)_a Sn(\text{—S-Z-}(COOR^m)_m)_{4-a} + tm \ (A^*)$$

where $R^1$ and a are as defined above, Z is an organic radical containing 1 to 30 carbon atoms, each $R^m$ is independently an organic radical derived from an alcohol containing 1 to 4 hydroxyl groups and containing 1 to 30 carbon atoms, and m is 1 to 4; admixed with one or more compounds selected from the group consisting of monoalkyl tin sulfides and dialkyl tin sulfides, in which group each alkyl substituent independently is straight or branched alkyl containing 1 to 12 carbon atoms;
and further comprising a component corresponding to component (b) as defined above, and a component corresponding to component (c) as defined above.

Another additional aspect of the present invention is an activator system comprising
(a') one or more compounds of formula (A*)

where $R^1$ and a are as defined above, Z is an organic radical containing 1 to 30 carbon atoms, each $R^m$ is independently an organic radical derived from an alcohol containing 1 to 4 hydroxyl groups and containing 1 to 30 carbon atoms, and m is 1 to 4; admixed with one or more compounds selected from the group consisting of monoalkyl tin sulfides and dialkyl tin sulfides, in which group each alkyl substituent independently is straight or branched alkyl containing 1 to 12 carbon atoms;
wherein the molar ratio of monoalkyl tin compounds to dialkyl tin compounds is at least 0.5:1;
and further comprising a component corresponding to component (b) as defined above and, optionally, an ester component corresponding to component (c) as defined above.

One or more alkyl mercaptans of the formula $R^+\text{—SH}$ can also be present in addition to, or in place of, the compounds of the formula $HS\text{—}R^c\text{—}OC(=O)R^3$. The alkyl group R is straight or branched and can contain 6 to 24 carbon atoms.

Another aspect of the present invention comprises foamed, rigid PVC compositions comprising one (or more) of the activator systems of the present invention.

Yet another aspect of the present invention comprises the method of producing a foamed rigid PVC composition, comprising subjecting a foamable composition comprising PVC, one or more of the activator systems of the present invention, and one or more blowing agents, to conditions under which said composition is converted into foamed, rigid PVC.

DETAILED DESCRIPTION OF THE INVENTION

The successful production of rigid articles from foamed polyvinylchloride requires a balance of many factors in the formulation of the compositions to be extruded or otherwise formed. The complete formulation comprises the polyvinylchloride resin, including an activator system of the present invention, and a blowing agent (by which term is meant one or more than one chemical compound which is useful as a blowing compound) and other optional but conventional components such as processing agents, impact modifiers and internal and external lubricants.

Chemical blowing compounds that release nitrogen may be used in forming a microcellular structure in the vinyl-chloride resins used in making the foamed compositions. The preferred chemical blowing agents are amides, particularly azamides and more specifically azodicarbonamide. Examples of other useful blowing agents are:

N,N'-dinitroso-N,N'-dimethyl terephthalimide
  N-aminophthalimide
4,4'-oxybis (benzenesulphonylhydrazide)
N,N'-dinitrosopentamethylenetetramine
Azoisobutyric dinitrile
Diazoaminobenzene
Dinitropentamethylene tetramine
Benzenesulfohydrazide
Terephthalyl bis (N-nitrosomethylamide)
Toluene-2,4-bis (sulfonyl hydrazide)
p-tertiary butylbenzazide
p-carbomethoxy benzazide
Diarylpentaazadiene
3 methyl-1,5-diphenylpentaazadiene The blowing agent is used in an amount sufficient to produce the degree of foaming desired and generally can be used in an amount of about 0.1 to about 3.5 parts by weight per 100 parts of resin being blown.

The activator system functions to control the temperature at which the vinyl resin fuses to provide the proper environment into which the blowing agent releases gaseous nitrogen. Unless the activator system of this invention is used in combination with a blowing agent as shown in the formulations above, improper blow occurs throughout the structure, the profile is uneven and either is not encased in a skin or the skin becomes uneven and rough due to the presence of blow holes. These problems are especially severe and present when the vinyl resin being blown is unplasticized.

One aspect of the present invention comprises compounds of the formula (A):

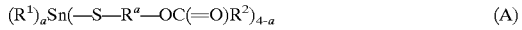

In this formula each $R^1$ is a straight or branched alkyl group containing 1 to 12, and preferably 1 to 4 carbon atoms. Preferred examples include methyl and butyl. The radical $R^a$ contains 2 to 20 carbon atoms, and preferably 2 to 6 carbon atoms. A preferred $R^a$ is $\text{—CH}_2\text{CH}_2\text{—}$.

The $R^2$ is preferably derived from a medium-chain or long-chain fatty acid $R^2C(=O)OH$, or a mixture of two or more such acids. A preferred example of such a mixture is tall oil fatty acids, which is a well-known term for a mixture generally containing fatty acids 16 to 22 carbon atoms-in length. Examples of other $R^2$ radicals include the residues of acids such as heptanoic, heptenoic, octanoic (caprylic), octenoic, nonanoic, nonenoic, decanoic, tetradecanoic (myristic), dodecanoic (lauric), hexadecanoic (palmitic), octadecanoic (stearic), as well as oleic, linoleic, linolenic, gadoleic, arachidonic, behenic, and the like.

Compositions containing compositions of formula (A) will preferably include a mixture or monoalkyl and dialkyl derivatives, representing different values of the subscript a. However, compositions containing only one compound of formula (A) can be used.

The compositions of formula (A) are admixed with one or more monoalkyl tin sulfides and/or dialkyl tin sulfides. In these sulfides, each alkyl group independently contains 1 to 12, and preferably 1 to 4 carbon atoms. Preferred alkyl groups include methyl and butyl.

While the monoalkyl tin sulfides and dialkyl tin sulfides can be present together in any mixture of derivatives and in any ratio to each other, or one can be present individually to the exclusion of the others, it is preferred that the mole ratio of all monoalkyl tin compounds (that is, monoalkyl compounds of formula (A) and monoalkyl tin sulfides) to all dialkyl tin compounds (that is, dialkyl compounds of formula (A) and dialkyl tin sulfides) be at least 0.2:1, more preferably at least 1:1, and yet more preferably 2:1 to 4:1. In a most preferred embodiment this ratio is about 3:1.

The ratio of all compounds of formula (A) present, to the total of monoalkyl tin sulfides and dialkyl tin sulfides present should be in the range of about 10:1 to 0.1:1, and preferably in the range of 1:1 to 2:1.

The admixture can be prepared by adding monoalkyl tin trihalide and/or dialkyl tin dihalide to an alkaline solution of, for example, ammonium hydroxide, potassium hydroxide, or sodium hydroxide; reacting this solution with an amount of mercapto ester HS—$R^a$—OC(=O)$R^2$ less than sufficient to react with all the monoalkyl tin and dialkyl tin present; and then adding a solution of a sulfide such as sodium sulfide in water, in an amount that will convert remaining monoalkyl tin and dialkyl tin to the corresponding sulfides. The amounts of the respective reactants used are selected to provide the products in the desired final ratios with respect to each other.

Also present in the activators of the present invention is a complex formed of a diorganotin oxide with an ester of an oxygen-containing acid. Preferably the diorgano tin oxide is a dialkyl tin oxide wherein each alkyl group contains 1 to 8 carbon atoms. A preferred oxide is dibutyl tin oxide.

Many esters of oxygen-containing acids are useful in the activator. Preferred are the phthalates, including diisooctyl phthalate (DIOP), as well as dimethyl phthalate, diethyl phthalate, propyl phthalate, dibutyl phthalate, dibutyl phthalate, diamyl phthalate, dioctyl phthalate, butyl glycol phthalate, diphenylphthalate, methoxyethyl phthalate, and butoxyethyl phthalate. Other oxygen-containing esters include but are not limited to ethyl ortho silicate, triethyl arsenate, n-propyl nitrate, n-octyl nitrate, o-cresyl-p-toluene sulphonate, cyclohexyl p-toluene sulphonamide, di-n-propyl sulfate, di-n-dodecyl sulfate, trimethyl phosphate, triethyl phosphate, tri-n-propyl phosphate, tributylphosphate, tri-isobutyl phosphate, triamyl phosphate, tri-o-cresyl phosphate, tri-p-cresyl phosphate, tri-m-cresyl phosphate, triphenyl phosphate, trixylyl phosphate, butyl di-(β-methoxyethyl) phosphate, butyl di(β-ethoxyethyl) phosphate, sorbityl hexaphosphate, amylborate, methyl acetate, ethyl acetate, n-propylacetate, isopropyl acetate, butylacetate, m-cresyl acetate, phenyl acetate, ethylene glycol diacetate, diglycerol tetraacetate, glycerol monolactate acetate, methyl propionate, n-butyl propionate, sec-butyl propionate, ethylene glycol dipropionate, triethylene glycol dipropionate, ethyl butyrate, n-propyl butyrate, butyl butyrate, pentyl butyrate, 2-propenyl butyrate, hexyl butyrate, ethylene glycol dibutyrate, ethyl laurate, phenyl laurate, ethyl stearate, butyl stearate, ethyl. palmitate, 2-naphthyl lactate, ethyl benzoate, β-naphthyl benzoate, benzyl benzoate, methyl o-benzoyl benzoate, ethyl o-benzoyl benzoate, amyl benzoate, sorbityl hexabenzoate, diethyl oxalate, dibutyl oxalate, diethyl oxalate, diamyl oxalate, dimethyl maleate, diethyl maleate, dipropyl maleate, dipropenyl maleate, diethyl adipate, dibutyl adipate, ethoxyethyl adipate, diethyl sebacate, dibutyl sebacate, diethyl succinate, dibutyl succinate, triethyl citrate, tributyl citrate, dibutyl tartrate, dibutyl tartrate, diamyl tartrate, methyl phthalyl ethyl glycolate, ethyl phthalyl ethyl glycolate, butyl phthalyl butyl glycolate, methyl salicylate, phenyl salicylate, dioctyl thiodipropionate and dithiobis (isooctyl propionate).

The complex is preferably formed by combining the oxide and ester components and heating the mixture to liquefaction or dissolution, whereupon the components react and from a stable, homogeneous product. Preferably the mole ratio of the oxide to the acid is in the range 1.1:1 to 1:1.1, and more preferably 1:1.

The mole ratio of the amount of the component of formula (A) to the amount of the complex is generally in the range 2:1 to 0.5:1 and preferably 1.5:1 to 0.8:1.

A mercapto ester component is preferably present in the activator composition together with the admixture of the compound(s) of formula (A), the monoalkyl tin and/or dialkyl tin sulfides, and the complex of diorganotin oxide-oxygen-containing acid. This mercapto ester component comprises one or more esters of the formula HS—$R^c$—OC(=O)$R^3$. $R^c$ is a divalent alkyl radical containing 2 to 20 carbon atoms, and preferably 2 to 6 carbon atoms. A preferred $R^c$ is —CH$_2$CH$_2$—. The radical $R^3$ is straight or branched alkyl or alkenyl containing 6 to 24 carbon atoms and 0 to 4 carbon—carbon double bonds. As is the case for the radical $R^2$ defined herein, $R^3$ is preferably the residue of a medium-chain or long-chain fatty acid, or of a mixture of such acids. Exemplary radicals include residues of the alkanoic and alkenoic acids exemplified herein for $R^2$.

When one or more esters of the formula HS—$R^c$—OC(=O)$R^3$ and/or one or more alkyl mercaptans of the formula $R^+$—SH are present in the activator composition, the total amount thereof should generally correspond to a mole ratio of 0.01:1 to 0.2:1 based on the amount present of compounds of formula (A). Preferably, this mole ratio is in the range of up to 0.1:1.

In another aspect of the present invention, an activator composition can be formed which comprises one or more of the aforementioned complexes of diorganotin oxide and oxygen-containing ester, one or more of the aforementioned esters of the formula HS—$R^c$—OC(=O)$R^3$, and an admixture as defined hereinabove of one or more monoalkyl tin sulfides, dialkyl tin sulfides, or preferably both, with an ester of the formula (A*)

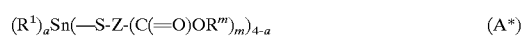

$$(R^1)_a Sn(-S\text{-}Z\text{-}(C(=O)OR^m)_m)_{4-a} \qquad (A^*)$$

In this formula, $R^1$ and a are as defined above, and m is 1 to 4. The moiety -Z- is a divalent organic radical which preferably is alkyl containing 1 to 30 carbon atoms, and more preferably is ethyl. The radical $R^m$ is an organic group derived from an alcohol containing 1 to 30 carbon atoms and 1 to 4 hydroxyl groups. The preferred moiety —S-Z-(C(=O)OR$^m$)$_m$ is a thioglycolate such as octyl thioglycolate. Preferred compounds of formula (A*) include dimethyl tin bis(isooctylthioglycolate).

Another embodiment of the present invention comprises activators comprising one or more esters of formula (A*) admixed with monoalkyl tin sulfide and dialkyl tin sulfide, as defined hereinabove, and further comprising one or more of the aforementioned complexes of diorganotin oxide and oxygen-containing ester. The mole ratio of all monoalkyl tin compounds to all dialkyl tin compounds (based on esters of formula (A*) together with sulfides) is at least 0.2:1, more preferably at least 1:1, and most preferably 2:1 to 4:1. Otherwise when an ester of formula (A*) is used, the relative amounts of it to the other activator components, and the amounts of such other components to each other, are the same as stated above for the embodiments when an ester of formula (A) is used.

The compositions of the present invention are preferably used to advantage in combination with vinyl halide resins, preferably polyvinyl chloride resins. The term "polyvinyl chloride" as used herein is inclusive of any polymer formed at least in part of the recurring group (—CHCl—CX$_2$—) and having a chlorine content in excess of 40%. In this formula, each of the X groups can be either hydrogen or chlorine, and p is the number of units in each polymer chain. In polyvinyl chloride homopolymers, each of the X groups is hydrogen. Thus, the terms "PVC" and "polyvinyl chloride" include not only polyvinyl chloride homopolymers but also after-chlorinated polyvinyl chlorides, as well as copolymers of vinyl chloride in a major proportion with other copolymerizable monomers in moderate proportion such as copolymers of vinyl chloride and vinyl acetate, copolymers of vinyl chloride with maleic or fumaric acids or esters, and copolymers of vinyl chloride with styrene. The stabilizer compositions are effective also with mixtures of polyvinyl chloride in major proportion with a minor proportion of other synthetic resins such as chlorinated polyethylene or copolymers of acrylonitrile, butylene and styrene.

The compositions of the present invention are used in small but effective amounts to activate the blowing agents and impart heat-stability, that is, enhanced resistance to heat-mediated deterioration which is due to exposure to excessive heat, as well as deterioration which is initiated or accelerated by exposure to heat. Effective performance is afforded generally by adding about 0.1 to about 5 phr (parts by weight per hundred parts by weight of resin) of the composition. Preferred amounts of the composition are generally in the range of about 1 to 4 phr. The composition can be compounded into the resin formulation in accordance with conventional compounding techniques abundantly familiar to one of ordinary skill in this art.

The compositions of the present invention can be used with unplasticized or plasticized polyvinyl chloride resin compositions of conventional formulation. Conventional plasticizers well known to those skilled in the art can be employed such as, for example, dioctyl phthalate, octyl diphenylphospate, and epoxidized soybean oil. Particularly useful plasticizers are the epoxidized esters having from 20 to 150 carbon atoms. Plasticizers, if used, generally comprise 5 to 40 phr.

The polyvinyl chloride resin composition comprising these components can also contain conventional additional additives such as antioxidants, lubricity agents, flame retardants, fillers, pigments, and the like, in relative amounts effective to fulfill the desired functions of each ingredient. These ingredients, if desired, can be added prior to, during, or subsequent to the step in which the composition of the present invention is compounded into the polyvinyl chloride.

Conventional processing aids may also be used in the amounts necessary to smooth and homogenize the blowable composition melt and facilitate its passage through a conventional extruder.

After the components in the formulation have been mixed in the manner described, this dry blend composition is then processed in a conventional extruder which has been fitted with the desired die and which extruder has been heated to the desired temperature. The extruder is then operated at a screw speed under a motor load as indicated for the rate desired. The temperatures and residence times are selected to form products which are commercially acceptable. Unless the activator system as shown herein is used in the formulations described there is danger of excessive decomposition of the exothermic chemical blowing agents resulting in loss of control an unsatisfactory cell structure, required profile dimensions and smoothness of skin which is dependent upon the internal microcellular structure of the profile.

The chemical balance present in the blowable composition of this invention results in the proper fluxing of the vinyl resin to produce a molten mixture into which the gaseous nitrogen is released at the proper time by the blowing agent, which then becomes dissolved in the molten plastic under the operating pressures of the extruder. As the plastic molt passes through the die into the atmosphere the pressure built up within the extruder is relieved causing the dissolved gaseous nitrogen to emerge from solution and form the microcellular gas cells uniformly throughout the extruded mass other than within the skin layer. The skin layer forms because of the laminar flow across the relatively cool metal surface of the die. Laminar flow is described as being a series of concentric layers of molten plastic, the most interior layer moving somewhat faster than the outer layers. The molten thermoplastic mixture that touches the cooler metal surface of the die becomes much more viscous than the next layer thereof and as a result a smearing action drives the gaseous nitrogen into the interior layers of the profile to thereby form a relatively smooth and integral skin. The successful performance as just described depends upon the formulation of the expandable composition and particularly upon the combination of the activator system described herein in combination with the chemical blowing agent and the particular resin being blown.

The formation of a smooth integral skin is dependent, among other things, upon the amount of chemical blowing agent used. If a certain porosity is desired beyond an amount which requires a greater amount of blowing agent, it is obvious that although the increased porosity is achieved, the skin will have been disrupted and its smoothness destroyed. The present invention permits a maximum expansion of the extruded profile or a minimum density foam without destroying the requirements of a smooth and integral skin. This is achieved in the present invention by the use of the activator system which functions to extract a maximum amount of gas from the blowing agent at the preferred thermal conditions for extrusion, thus producing a blow which would otherwise be possible only by increasing the amount of blowing agent. Thus the present activator system of this invention permits a fine adjustment with regard to the amount of gas released from the chemical blowing agent and thus preserving the desirable properties of the smooth and integral skin required for the profile. The activator system of this invention functions to control the temperature and rate at which the gaseous nitrogen is released from the chemical blowing agent, which temperature and rate are adjusted in such a way that the resin composition becomes a plastic melt at a temperature to permit its expansion while at the same time restricting the size of the cells to the microcellular characteristics required in the profile.

The utility of the foamed polyvinylchloride resins of the present invention is extensive, being useful wherever foamed polyvinylchloride resin has found utility. It is particularly of value in locations where it is visible since by use of the present activators in the foaming operation, the foamed resin does not become colored as can occur when the foaming occurs at high temperatures. Thus, for example, the foamed polyvinylchloride resins of the present process can be used as the inner-most layer of pipe, or the intermediate layer of a three-layer system, by coextrusion with unfoamed resin. Other such visible uses include construction profiles such as window and door frames. By limiting the discoloration of the resin and forming a skin of good texture, the present invention produces foamed resin which is not limited by its appearance to interior applications.

The following example further illustrates the invention and is not intended to limit the scope of the invention described herein.

EXAMPLE 1

Into 200 grams of water was dissolved 130.2 grams (1.4977 moles of chloride) of 3:1 (molar) monomethyl tin chloride: dimethyl tin chloride reagent. This solution was heated to 60°–70° C., and then 187.2 grams of a 20 wt. % aqueous solution of NaOH (0.9361 moles NaOH) was added followed by 332.2 grams (0.9361 moles) of 2-mercaptoethyl tallate (9.3% SH). The resulting mixture was agitated for 30 minutes. Then, 36.5 grams (0.2808 moles) of Na₂S and 200 grams of water were added. The resulting mixture was agitated and then allowed to settle for 2 hours, whereupon it separated into two distinct layers of liquid. The upper layer was recovered and stripped at 20 mm Hg at up to 110° C. To the stripped product was added 5.0 grams of filter aid ("Supercel"); the product was filtered, providing 390 grams of product (1-A) comprising mono-/dimethyl tin mercapto-ethyl tallate-mono-/dimethyl tin sulfide (mono:di=3:1).

Separately, 2,250 pounds of diisooctyl phthalate was charged to a reactor and heated to 145°–150° C. To this was added 2,250 pounds of dibutyl tin oxide, over about one hour. The resulting mixture was stirred for about half an hour to produce a clear liquid, which was then cooled to 120°–125° C. Filter aid (30 pounds) was added and the liquid was filtered and recirculated, to provide product (1-B).

Equal amounts by weight of products (1-A) and (1-B) were combined and stirred together to form a homogeneous liquid product (1-C). This product was found to be an effective activator for the degradation of azodicarbonamide in PVC, compared to an equal amount of a 1:1 mixture of a dimethyl tin isooctyl thioglycolate: dibutyl tin oxide/ diisooctyl phthalate complex as described in the aforementioned U.S. Pat. No. 4,977,193.

COMPARATIVE EXAMPLE

A composition according to component (a) as defined hereinabove, mono/dimethyl tin mercaptoethyl tallate/ sulfide, having a 3:1 mole ratio of monomethyl tin species to dimethyl tin species, was prepared and formulated into an activator as shown in the table below. This activator was compared, as to its effect as an activator of the blowing agent azodicarbonamide ("AZO"), to a reference activator prepared according to U.S. Pat. No. 4,977,193. The compositions contained (in % by weight of the composition):

|  | A = Activator of the Invention | X = Reference Activator |
|---|---|---|
| Dimethyl tin 2-ethylhexyl-thioglycolate | 0. | 50. |
| 3:1 Mono/ dimethyl tin mercaptoethyl tallate/sulfide | 40 | 0. |
| Dibutyl tin oxide/diisooctyl phthalate, 1:1 (molar) complex | 50. | 50. |
| Mercaptoethyl tallate | 10. | 0. |

Each activator was compounded into a PVC formulation having the following formula:

| Component | Parts by weight |
|---|---|
| PVC (K-value = 67) | 100.0 |
| Calcium stearate | 1.0 |
| Paraffin waxes | 0.5 |
| TiO₂ | 1.0 |
| CaCO₃ | 5.0 |
| AZO | 0.4 |
| Acrylate processing aids ("Paraloid K-400" and "Paraloid K-175", Rohm & Haas) | 4.5 |
| | 1.5 |
| Activator | 1.5 |

After preparation and extrusion under identical conditions, the sample prepared using the activator of the present invention had a density of 0.53 grams/cc, whereas the sample prepared using the reference activator had a density of 0.58 grams/cc.

This 8.6% improvement in density signifies greatly improved activation of the AZO blowing agent, and signifies a significantly superior PVC product. While this improvement is clearly seen to be unexpected upon comparison of the densities obtained, the improvement is all the more unexpected given that it was obtained using, with the present invention, fewer moles of tin compound in the PVC sample. The lower amount of tin could be expected to cause the activation to be lower, whereas in fact it was higher, as evidenced by the reduction in density.

What is claimed is:

1. A foamed rigid PVC composition comprising PVC and an activator system, wherein said activator system comprises
(a) one or more compounds of formula (A)

$$(R^1)_a Sn(-S-R^a-OC(=O)R^2)_{4-a} \qquad (A)$$

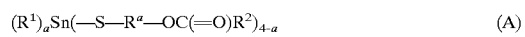

wherein $R^1$ independently at each occurrence is straight or branched alkyl containing 1 to 12 carbon atoms;
$R^a$ is a divalent alkyl radical containing 2 to 20 carbon atoms;
a is 1 to 2;
$R^2$ independently at each occurrence is straight or branched alkyl or alkenyl containing 6 to 24 carbon atoms and 0 to 4 carbon—carbon double bonds;
admixed with one or more compounds selected from the group consisting of monoalkyl tin sulfides and dialkyltin sulfides, in which group each alkyl substituent is independently straight or branched alkyl containing 1 to 12 carbon atoms; and
(b) a diorganotin complex with an ester of an oxygen-containing acid, wherein the two organo groups are each attached to tin through carbon atoms and are hydrocarbon radicals having from 1 to about 30 carbon atoms, and said complex is derived from the reaction of a diorganotin oxide with an ester derived from an aliphatic or aromatic alcohol or phenol and an acid selected from the group consisting of hydrocarbyl carboxylic acids, sulfur-containing hydrocarbyl carboxylic acids, hydroxy-containing hydrocarbyl carboxylic acids, phosphoric acid, sulfuric acid, sulphurous acid, nitric acid, nitrous acid, boric acid, arsenic acid and silicic acid.

2. The foamed rigid PVC composition of claim 1 wherein said activator system comprises a mixture of one or more compounds of formula (A) wherein a is 1, one or more compounds of formula (A) wherein a is 2, one or more monoalkyl tin sulfides, and one or more dialkyl tin sulfides.

3. The foamed rigid PVC composition of claim 2 where all $R^1$ substituents and the alkyl groups on all monoalkyl and dialkyl tin sulfides present are methyl; $R^a$ is —CH$_2$CH$_2$—; said diorganotin oxide is dibutyl tin oxide and said ester is diisooctyl phthalate.

4. The foamed rigid PVC composition of claim 1 wherein said activator system further comprises one or more esters of the formula HS—$R^c$—OC(=O)$R^3$, wherein $R^c$ is a divalent alkyl radical containing 2 to 20 carbon atoms, and $R^3$ is straight or branched alkyl or alkenyl containing 6 to 24 carbon atoms and 0 to 4 carbon—carbon double bonds.

5. The foamed rigid PVC composition of claim 4 wherein said activator comprises a mixture of one or more compounds of formula (A) wherein a is 1, one or more compounds of formula (A) wherein a is 2, one or more monoalkyl tin sulfides, and one or more dialkyl tin sulfides.

6. The foamed rigid PVC composition of claim 5 where all $R^1$ substituents and the alkyl groups on all monoalkyl and dialkyl tin sulfides present are methyl; $R^a$ is —CH$_2$CH$_2$—; said diorganotin oxide is dibutyl tin oxide and said ester is diisooctyl phthalate.

7. A foamed rigid PVC composition comprising PVC and an activator system, wherein said activator system comprises (a') one or more compounds of formula (A*)

$$(R^1)_aSn(-S-Z-(COOR^m)_m)_{4-a} \qquad (A^*)$$

where $R^1$ independently at each occurrence is straight or branched alkyl containing 1 to 12 carbon atoms, a is 1 to 2, Z is an organic radical containing 1 to 30 carbon atoms, each $R^m$ is independently an organic radical derived from an alcohol containing 1 to 4 hydroxyl groups and containing 1 to 30 carbon atoms, and m is 1 to 4; admixed with one or more compounds selected from the group consisting of monoalkyl tin sulfides and dialkyl tin sulfides, in which group each alkyl substituent independently is straight or branched alkyl containing 1 to 12 carbon atoms;
(b) a diorganotin complex with an ester of an oxygen-containing acid, wherein the two organo groups are each attached to tin through carbon atoms and are hydrocarbon radicals having from 1 to about 30 carbon atoms, and said complex is derived from the reaction of a diorganotin oxide with an ester derived from an aliphatic or aromatic alcohol or phenol and an acid selected from the group consisting of hydrocarbyl carboxylic acids, hydroxy-containing hydrocarbyl carboxylic acids, phosphoric acid, sulfuric acid, arsenic acid and silicic acid; and one or more esters of the formula HS—$R^c$—OC(=O)$R^3$, wherein $R^c$ is a divalent alkyl radical containing 2 to 20 carbon atoms, and $R^3$ is straight or branched alkyl or alkenyl containing 6 to 24 carbon atoms and 0 to 4 carbon—carbon double bonds.

8. The rigid PVC composition of claim 7 wherein said activator system comprises a mixture of one or more compounds of formula (A*) wherein a is 1, one or more compounds of formula (A*) wherein a is 2, one or more monoalkyl tin sulfides, and one or more dialkyl tin sulfides.

9. The rigid PVC composition of claim 8 where all $R^1$ substituents and the alkyl groups on all monoalkyl and dialkyl tin sulfides present are methyl; $R^a$ is —CH$_2$CH$_2$—; said diorganotin oxide is dibutyl tin oxide and said ester is diisooctyl phthalate.

10. The rigid PVC composition of claim 7 wherein the molar ratio of monoalkyl tin compounds to dialkyl tin compounds is at least 0.2:1.

11. A method of producing a foamed rigid PVC composition comprising subjecting a foamable composition comprising PVC, a blowing agent for said foamable composition, and an activator system to conditions under which said foamable composition is converted into foamed rigid PVC, wherein said activator system comprises
(a) one or more compounds of formula (A)

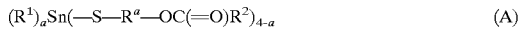

$$(R^1)_aSn(-S-R^a-OC(=O)R^2)_{4-a} \qquad (A)$$

wherein $R^1$ independently at each occurrence is straight or branched alkyl containing 1 to 12 carbon atoms;
$R^a$ is a divalent alkyl radical containing 2 to 20 carbon atoms;
a is 1 to 2;
$R^2$ independently at each occurrence is straight or branched alkyl or alkenyl containing 6 to 24 carbon atoms and 0 to 4 carbon—carbon double bonds;
admixed with one or more compounds selected from the group consisting of monoalkyl tin sulfides and dialkyltin sulfides, in which group each alkyl substituent is independently straight or branched alkyl containing 1 to 12 carbon atoms; and
(b) a diorganotin complex with an ester of an oxygen-containing acid, wherein the two organo groups are each attached to tin through carbon atoms and are hydrocarbon radicals having from 1 to about 30 carbon atoms, and said complex is derived from the reaction of a diorganotin oxide with an ester derived from an aliphatic or aromatic alcohol or phenol and an acid selected from the group consisting of hydrocarbyl carboxylic acids, sulfur-containing hydrocarbyl carboxylic acids, hydroxy-containing hydrocarbyl carboxylic acids, phosphoric acid, sulfuric acid, sulphurous acid, nitric acid, nitrous acid, boric acid, arsenic acid and silicic acid.

12. The method of claim 11 wherein said activator system comprises a mixture of one or more compounds of formula (A) wherein a is 1, one or more compounds of formula (A) wherein a is 2, one or more monoalkyl tin sulfides, and one or more dialkyl tin sulfides.

13. The method of claim 12 where all $R^1$ substituents and the alkyl groups on all monoalkyl and dialkyl tin sulfides present are methyl; $R^a$ is —CH$_2$CH$_2$—; said diorganotin oxide is dibutyl tin oxide and said ester is diisooctyl phthalate.

14. The method of claim 11 wherein said activator system further comprises one or more esters of the formula HS—$R^c$—OC(=O)$R^3$, wherein $R^c$ is a divalent alkyl radical containing 2 to 20 carbon atoms, and $R^3$ is straight or branched alkyl or alkenyl containing 6 to 24 carbon atoms and 0 to 4 carbon—carbon double bonds.

15. The method of claim 14 wherein said activator system comprises a mixture of one or more compounds of formula (A*) wherein a is 1, one or more compounds of formula (A*) wherein a is 2, one or more monoalkyl tin sulfides, and one or more dialkyl tin sulfides.

16. The method of claim 15 where all $R^1$ substituents and the alkyl groups on all monoalkyl and dialkyl tin sulfides present are methyl; $R^a$ is —CH$_2$CH$_2$—; said diorganotin oxide is dibutyl tin oxide and said ester is diisooctyl phthalate.

17. A method of producing a foamed rigid PVC composition comprising subjecting a foamable composition comprising PVC, a blowing agent for said foamable composition, and an activator system to conditions under which said foamable composition is converted into foamed rigid PVC, wherein said activator system comprises (a') one or more compounds of formula (A*)

$$(R^1)_a Sn(\text{—S-Z-}(COOR^m)_m)_{4-a} \quad (A^*)$$

where $R^1$ independently at each occurrence is straight or branched alkyl containing 1 to 12 carbon atoms, a is 1 to 2, Z is an organic radical containing 1 to 30 carbon atoms, each $R^m$ is independently an organic radical derived from an alcohol containing 1 to 4 hydroxyl groups and containing 1 to 30 carbon atoms, and m is 1 to 4; admixed with one or more compounds selected from the group consisting of monoalkyl tin sulfides and dialkyl tin sulfides, in which group each alkyl substituent independently is straight or branched alkyl containing 1 to 12 carbon atoms;

(b) a diorganotin complex with an ester of an oxygen-containing acid, wherein the two organo groups are each attached to tin through carbon atoms and are hydrocarbon radicals having from 1 to about 30 carbon atoms, and said complex is derived from the reaction of a diorganotin oxide with an ester derived from an aliphatic or aromatic alcohol or phenol and an acid selected from the group consisting of hydrocarbyl carboxylic acids, hydroxy-containing hydrocarbyl carboxylic acids, phosphoric acid, sulfuric acid, arsenic acid and silicic acid; and one or more esters of the formula $HS\text{—}R^c\text{—}OC(=O)R^3$, wherein $R^c$ is a divalent alkyl radical containing 2 to 20 carbon atoms, and $R^3$ is straight or branched alkyl or alkenyl containing 6 to 24 carbon atoms and 0 to 4 carbon—carbon double bonds.

18. The method of claim 17 wherein said activator system comprises a mixture of one or more compounds of formula (A*) wherein a is 1, one or more compounds of formula (A*) wherein a is 2, one or more monoalkyl tin sulfides, and one or more dialkyl tin sulfides.

19. The method of claim 18 where all $R^1$ substituents and the alkyl groups on all monoalkyl and dialkyl tin sulfides present are methyl; $R^a$ is —$CH_2CH_2$—; said diorganotin oxide is dibutyl tin oxide and said ester is diisooctyl phthalate.

20. The method of claim 17 wherein the molar ratio of monoalkyl tin compounds to dialkyl tin compounds is at least 0.2:1.

* * * * *

UNITED STATES PATENT AND TRADEMARK OFFICE
CERTIFICATE OF CORRECTION

PATENT NO. : 5,821,274
DATED : October 13, 1998
INVENTOR(S) : Curtis R. Martin

It is certified that error appears in the above-identified patent and that said Letters Patent are hereby corrected as shown below:

Column 3, line 4: delete " +tm "

Column 3, line 40: "R" should read -- $R^*$ --

Column 7, line 3: " ) " should read -- $)_p$ --

Signed and Sealed this

Fourteenth Day of December, 1999

Attest:

Q. TODD DICKINSON

Attesting Officer

Acting Commissioner of Patents and Trademarks